R. C. PRICE.
AUTOMOBILE LOCK.
APPLICATION FILED APR. 2, 1919.
1,312,204.
Patented Aug. 5, 1919.
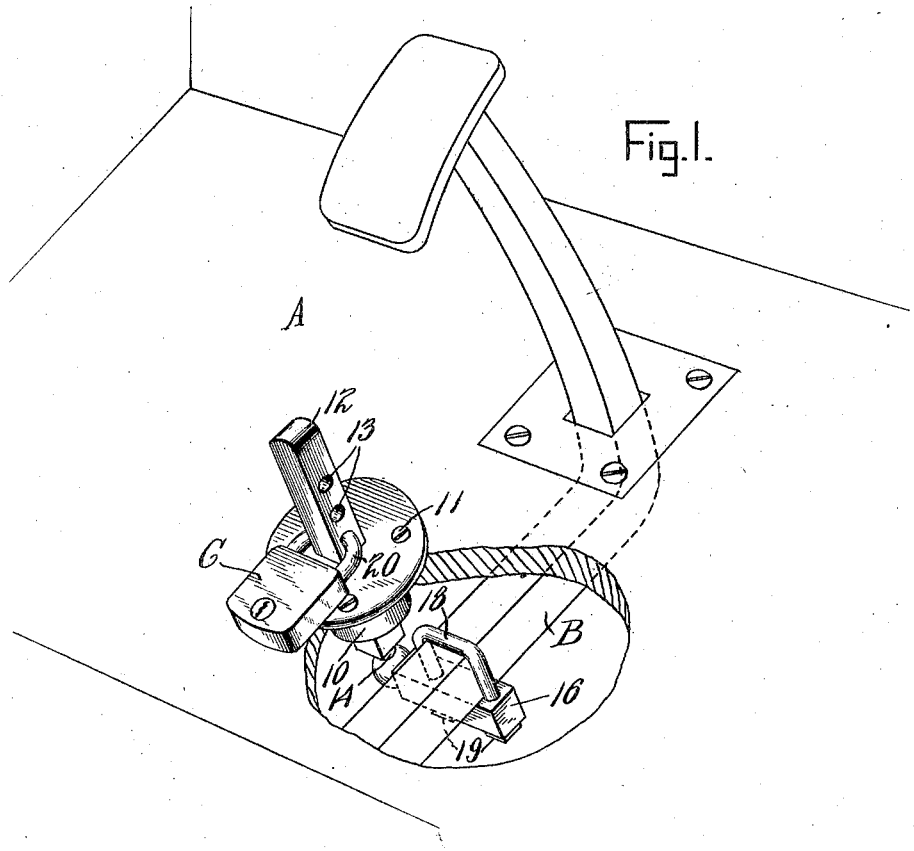
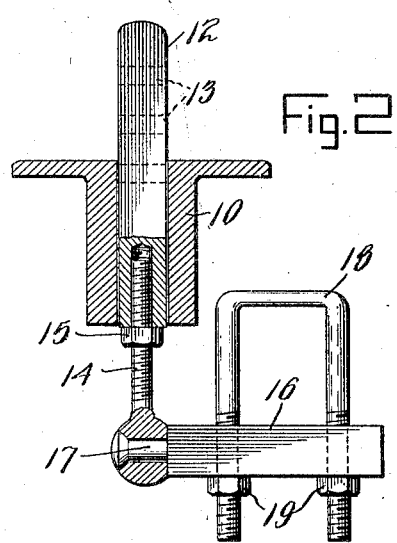
Inventor
Russell C. Price.

UNITED STATES PATENT OFFICE.

RUSSELL C. PRICE, OF FRANKFORT, INDIANA.

AUTOMOBILE-LOCK.

1,312,204.   Specification of Letters Patent.   Patented Aug. 5, 1919.

Application filed April 2, 1919. Serial No. 286,821.

*To all whom it may concern:*

Be it known that I, RUSSELL C. PRICE, a citizen of the United States, residing at Frankfort, in the county of Clinton and State of Indiana, have invented certain new and useful Improvements in Automobile-Locks, of which the following is a specification.

My said invention consists in certain improvements in the detail of construction and arrangement of parts of locks for automobiles, whereby an efficient lock is provided and one that will not interfere in any manner with the freedom of use and operation of the car, while at the same time insuring an effective lock, all as will be hereinafter more fully described and claimed.

Referring to the accompanying drawings, which are made a part hereof and on which similar reference characters indicate similar parts, Figure 1 is a perspective view showing the foot-board of an automobile with the clutch operating lever in position and with my improved lock in the position it occupies when in use, and Fig. 2, a detail view showing the parts constituting the locking device separately.

In said drawings the portions marked A represent the foot-board, and B the clutch operating lever, both of which may be of any approved or desired construction and arrangement.

The lock consists of a socket member 10 mounted to extend through the foot-board and secured in position by screws 11 projecting through an annular plate or flange on its upper end mounted in a circular recess in said foot-board. A member 12, preferably of steel and rectangular in cross section, is mounted to slide in the socket 10. It is formed with a series of apertures 13 for receiving the bar of a padlock C. A screw-threaded member 14 is mounted in a screw-threaded perforation in its lower end and is adjustable therein by means of said screw-threaded connection and a lock-nut 15 to secure it in an adjusted position. A horizontal member 16 is mounted on a pivot 17 on the lower end of said member 14 and carries a U-bolt 18 which projects through apertures in said member 16 and has clamping nuts 19 on its ends.

In operation the member 16 is clamped rigidly to that portion of the clutch operating lever B immediately beneath the footboard, by means of the clamping bolt 18 and the nuts 19. The member 12 projects through the socket 10 and is adapted to slide freely therein. The adjustment therefore does not in any manner interfere with the clutch operating lever, the pivoted connection between the member 14 and the member 16 allowing a free and easy movement between the parts. By reason of the adjustable connection between the member 12 and the member 14 the position of the apertures 13 can be adjusted to bring them to just the position desired relative to the plate on the upper end of socket 10.

When it is desired to lock the automobile the clutch and clutch operating lever B are locked in normal position by passing the bar 20 of the padlock C through one of the apertures 13 above the plate on socket 10 and closing the lock. By this means it is impossible to disengage the clutch for the purpose of shifting the gears so the car can be driven by the power of the engine until lock C is removed and this can only be done by the person carrying the key. Said lock C is an ordinary pin padlock, or may be a padlock of any other type preferred. The clutch being out of engagement it is possible to move the car by pushing it by hand, as when it is desired to move it in the garage or where it is being parked, as is sometimes the case, which could not be done if the car were locked with the clutch engaged.

Having thus fully described my said invention, what I claim as new and desire to secure by Letters Patent, is:

1. An automobile lock comprising a member clamped to the clutch operating lever beneath the foot board of the car, a socket member mounted in said foot board of the car, another member pivoted to said first mentioned member which is clamped to said lever and extending up through said socket member, said other member being provided with apertures in its upper end, and a lock mounted in said apertures, substantially as set forth.

2. An automobile lock comprising a member clamped to the clutch operating lever beneath the foot-board of the car, a socket member mounted in said foot-board, another member pivoted to said first member which is clamped to said lever and extending up through said socket member said other member being longitudinally adjustable and formed with apertures in its upper end, and a lock mounted in said apertures, substantially as set forth.

In witness whereof, I have hereunto set my hand and seal at Frankfort, Indiana, this 29th day of March, A. D. nineteen hundred and nineteen.

RUSSELL C. PRICE. [L. S.]

Witnesses:
THOMAS M. RYAN,
LETTIE A. BOND.